Dec. 11, 1923.
A. W. LOWRY
LOCK NUT
Filed April 8, 1922
1,477,509
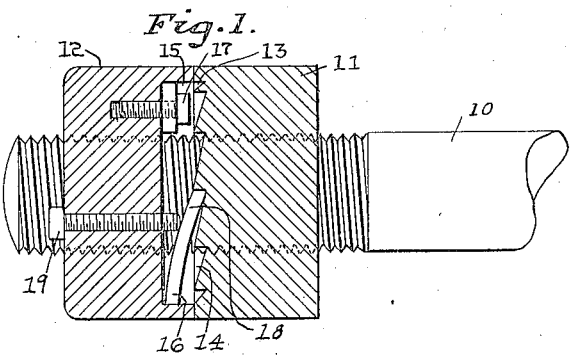
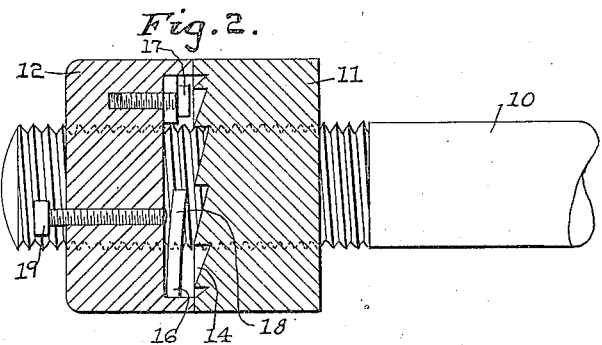
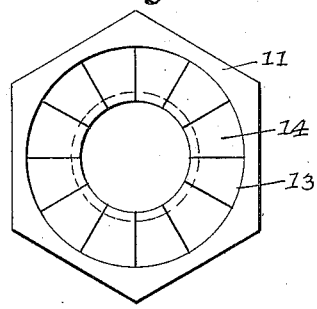
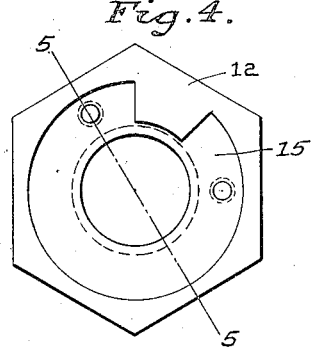
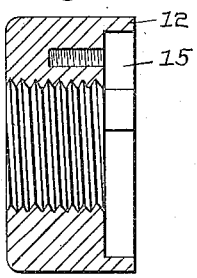
Aden W. Lowry
INVENTOR
BY Victor J. Evans
ATTORNEY Patented Dec. 11, 1923.

1,477,509

UNITED STATES PATENT OFFICE.

ADEN W. LOWRY, LONGTON, KANSAS.

LOCK NUT.

Application filed April 3, 1922. Serial No. 550,665.

*To all whom it may concern:*

Be it known that I, ADEN W. LOWRY, a citizen of the United States, residing at Longton, in the county of Elk and State of Kansas, have invented new and useful Improvements in Lock Nuts, of which the following is a specification.

This invention relates to improvements in lock nuts and has for an object the provision of means whereby a pair of nuts may be separately applied and locked together to prevent accidental retrograde movement.

Another object of the invention is the provision of means whereby a pair of nuts may be locked together as above stated, means however being provided for releasing the nuts to permit of their removal, the releasing means in no way mutilating the nuts so that the latter may be again used.

With the above and other objects in view, the invention further includes the following novel features and details of construction, to be hereinafter more fully described, illustrated in the accompanying drawings and pointed out in the appended claim.

In the drawings:—

Figure 1 is a sectional view showing the nut applied to a bolt in locked position.

Figure 2 is a similar view showing the nuts unlocked.

Figure 3 is an inner face view of one of the nuts.

Figure 4 is a similar view of the other nut.

Figure 5 is a section on the line 5—5 of Figure 4.

Referring in detail to the drawings, wherein like characters of reference denote corresponding parts, the reference character 10 indicates a portion of the bolt to which nuts 11 and 12 are shown applied. These nuts engage the threads of the bolt in the usual manner and the nut 11 is provided with a concentrically arranged recess 13 having in the bottom thereof radially arranged teeth 14. The nut 12 is also provided with a recess indicated at 15 and when the nuts are in use, the recesses 13 and 15 are opposed as shown in Figures 1 and 2.

The recess 15 preferably extends for only a portion of the distance around the bore of the nut and arranged within this recess is an arcuate resilient member 16. One end of this member is secured to the bottom of the recess 16 by means of a screw or similar fastening devices 17, while the opposite end 18 of the member 16 provides a dog for engagement with the teeth 14. Normally, the end 18 of the member 16 is located within the plane of the face of the nut 12 and therefore will not engage the teeth 14. It is forced outward however into such engagement by means of a screw 19 which engages a threaded opening 20 extending through the nut 12.

The nuts are arranged in the position shown in Figure 2, whereupon the screw may be forced inward to engage the teeth 14 and retrograde or reverse movement of the nuts will be prevented. To remove the nuts, the screw 19 is moved outward, whereupon the resilient character of the dog 18 will cause it to be desengaged from the teeth 14.

The invention is suscepticle or various changes in its form, proportions and minor details of construction and the right is herein reserved to make such changes as properly fall within the scope of the appended claim.

Having described the invention what is claimed is:—

The combination with a bolt, of a pair of superposed nuts provided with recesses in their opposed faces, ratchet teeth formed in the bottom of one of the recesses, a split resilient washer secured within the recess of the other nut and having one end extended obliquely and adapted to engage the ratchet teeth, a fastening element holding the opposite end of the washer within the recess and a threaded element carried by the last mentioned nut and engageable with the free end of the washer to force the same into engagement with the ratchet teeth.

In testimony whereof I affix my signature.

ADEN W. LOWRY.